(12) United States Patent
Motzno (10) Patent No.: US 10,576,489 B2
(45) Date of Patent: Mar. 3, 2020

(54) SYSTEM FOR MAINTAINING CONDUITS AND PIPES IN A PIPELINE SYSTEM

(71) Applicant: Douglas W. Motzno, Knightdale, NC (US)

(72) Inventor: Douglas W. Motzno, Knightdale, NC (US)

( * ) Notice: Subject to any disclaimer, the term of this patent is extended or adjusted under 35 U.S.C. 154(b) by 0 days.

(21) Appl. No.: 14/640,426

(22) Filed: Mar. 6, 2015

(65) Prior Publication Data

US 2016/0256903 A1 Sep. 8, 2016

(51) Int. Cl.
| | |
|---|---|
| *B08B 9/043* | (2006.01) |
| *B05B 13/04* | (2006.01) |
| *F16L 55/30* | (2006.01) |
| *G01M 3/00* | (2006.01) |
| *F16L 55/26* | (2006.01) |
| *E03F 9/00* | (2006.01) |
| *E03B 7/00* | (2006.01) |
| *F16L 55/40* | (2006.01) |
| *F16L 101/30* | (2006.01) |
| *F16L 101/12* | (2006.01) |
| *F16L 101/16* | (2006.01) |
| *F16L 101/18* | (2006.01) |

(52) U.S. Cl.
CPC .......... *B05B 13/0436* (2013.01); *B08B 9/043* (2013.01); *B08B 9/0433* (2013.01); *E03B 7/006* (2013.01); *E03F 9/002* (2013.01); *F16L 55/265* (2013.01); *F16L 55/30* (2013.01); *F16L 55/40* (2013.01); *G01M 3/005* (2013.01); *F16L 2101/12* (2013.01); *F16L 2101/16* (2013.01); *F16L 2101/18* (2013.01); *F16L 2101/30* (2013.01)

(58) Field of Classification Search
CPC ... B05B 13/0436; B08B 9/043; B08B 9/0433; E03B 7/006; E03F 9/002; F16L 2101/12; F16L 2101/16; F16L 2101/18; F16L 2101/30; F16L 55/265; F16L 55/30; F16L 55/40; G01M 3/005
USPC ........................................... 15/104.16, 327.4
See application file for complete search history.

(56) References Cited

U.S. PATENT DOCUMENTS

| | | | | |
|---|---|---|---|---|
| 712,901 | A * | 11/1902 | Black ................. | E21B 17/1057 166/241.4 |
| 5,358,042 | A * | 10/1994 | Stoltz ................. | E21B 17/1057 166/241.6 |
| 6,820,653 | B1 * | 11/2004 | Schempf ............... | B08B 9/043 138/97 |
| 2001/0043838 | A1 * | 11/2001 | Baugh .................... | E21B 4/18 405/184.1 |
| 2007/0214590 | A1 * | 9/2007 | Boe ........................ | B08B 9/049 15/104.061 |

* cited by examiner

*Primary Examiner* — Marc Carlson

(57) ABSTRACT

A system for maintaining conduits and pipes after their installation into a pipeline system used to transport material in a fluid or flowable form. The system includes a maintenance tool adopted for use inside the pipe, an umbilical attached to the maintenance tool for pulling the tool through the pipe; and a pluralities of bearings positioned around the umbilical in order to allow the tool to be pulled through the pipe around bends and turns in the pipe.

3 Claims, 14 Drawing Sheets

Figure 1

Prior Art

Figure 2

Prior Art

Figure 3

Prior Art

Figure 4

Prior Art

Figure 5

Prior Art

1. Cleaning

2. Lining

3. Inspection

SYSTEM FOR MAINTAINING CONDUITS AND PIPES IN A PIPELINE SYSTEM

CROSS-REFERENCE TO RELATED APPLICATION

The present application claims priority to provisional patent application Ser. No. 61/949,092 filed Mar. 6, 2014 and entitled "Device For Maintaining Conduits and Pipes In a Pipeline System."

TECHNICAL FIELD

The present invention generally relates to the field of transport conduits and pipes, and more particularly, is directed to a system for maintaining such conduits and pipes after their installation into a pipeline system used to transport material in a fluid or flowable form.

BACKGROUND OF THE INVENTION

Infrastructure, such as roadways, bridges, and water and energy distribution systems are necessary elements of a society and its economy. Like all physical objects that are in continuous use, infrastructure requires periodic maintenance and replacement. The present invention relates to transportation infrastructure that is implemented using a system of conduits and pipes. As used herein, the terms "pipe" and "conduit" are used interchangeably.

Pipeline systems are widely used to transport water, sewage, petroleum products and other materials that can be reduced to a flowable form. Pipeline distribution is efficient and when placed underground, does not interfere with surface use of the same land nor does it detract from the esthetic appeal of the land.

Because most pipelines are buried underground or concealed in some way, they are difficult to reach. Moreover, pipelines that are used to carry municipal services, such as water and sewage, or commercial products such as petroleum, tend to be very large in diameter and can be many miles in length. Thus, removing and replacing pipes in such systems is time consuming and expensive. While these types of pipeline systems are designed to have a long service life, they eventually do require maintenance.

Many pipeline systems are deployed over long distances and form a distribution highway for flowable materials of all kinds. Other pipeline systems are more local in nature, such as the plumbing system in one's home.

During their operation, pipelines tend to be susceptible to a buildup of undesirable deposits along their interior walls. The buildup can be formed from the material being carried by the pipeline or from byproducts created during the transport process. As the buildup continues, the bore or opening within the pipes that form the pipeline, progressively narrows resulting in a reduction in material flow over time and increased pressure within the pipe. If remedial measures are not taken, the bore will eventually close preventing all flow.

Sewage pipelines are particularly susceptible to a buildup of deposits along their inner walls from the sewage they carry and from sewage byproducts. Pipes that carry municipal drinking water also are not immune from a buildup of deposits in the form of, for example, iron and scale.

Petroleum pipelines are notorious for a buildup of paraffin along their inner walls.

In addition to restricted flow and ultimately clogging, a buildup of deposits along the inner walls of a pipeline can be particularly troublesome when portions of the pipe are subjected to wide variations in temperature.

The theory of thermal expansion holds that matter has a tendency to change in volume in response to a change in temperature. As the temperature of matter increases, so does its volume. Correspondingly, a matter's volume decreases as its temperature decreases. The degree of expansion or contraction, divided by the change in temperature, is known as a material's coefficient of thermal expansion.

The wall thickness of a pipe at a particular cross-section factors into the radial temperature gradient of the pipe at that particular cross-section. Thus, a pipe that has a thicker wall thickness at one cross-section due to a buildup of deposits has a different temperature gradient than the temperature gradient at a cross-section having a lesser buildup and thus smaller wall thickness.

Therefore, small temperature variances will be present along the pipeline corresponding to the relative changes in wall thickness due to the variations in deposit thickness built up along the pipe.

Were the inner walls of a pipeline pristine and not subject to a buildup of deposits, its coefficient of thermal expansion along its entire length would be constant, assuming that the temperature of the material carried by the pipeline and the temperature surrounding the pipe remains constant.

However, the buildup of deposits along its inner wall distorts continuity of the coefficient of thermal expansion due to the difference temperature gradients at different points along the pipeline. The discontinuity in expansion rates make the pipeline more susceptible to cracking and breaking at the points of discontinuity, especially when the pipe is under high pressure.

The increased risk of pipeline failure due to cracks and fractures caused by temperature variations is another reason to be concerned with the buildup of deposits along the inner walls of a pipeline.

The reduction in material flow in a pipeline due to the buildup of deposits along the inner wall of the pipes can only be reversed by (1) replacing the affected pipes; (2) increasing the pressure used to force the material through the pipeline; and/or (3) removing the deposit buildup from the pipes that form along their interior walls.

While increased material flow pressure can be an effective short term solution, it will not ameliorate or eliminate the buildup. Moreover, increased pressure places additional stress on the pipeline, increasing the risk of failure and the need for earlier replacement.

The prior art is aware of a number of methods and devices that are used to clean and remove deposits from the inner wall of pipes. These methods include various chemicals and flushes, many of which are name brands that are well known to home owners for maintenance of plumbing systems that are prone to clog. While chemical treatments are useful in some situations, they are not a complete solution due to toxicity and limited effectiveness.

Exposing the inner wall of pipes to certain forms of bacteria has also proved effective in some situations. Mechanical devices such as plungers, mechanical snakes and augers are popular for clearing a clogged pipe in the home. These devices have little utility for removing all contaminates and residue from the interior wall of a pipe but can suffice to at least temporarily open a clogged pipe.

Pipeline systems for commercial use, such as petroleum, water distribution, and sewage recovery, present a more substantial challenge and typically require a more robust approach than that required by a home owner.

High pressure water jetting, pipeline pigs, ultrasonic sound blasts, mechanical rotary drilling and hydro blasting are often used to clean commercial pipeline systems.

As known in the art, a pipeline pig is formed of a body having a diameter and outer circumference that closely matches the inner circumference of the pipe. The pig is forced through the pipe by fluid pressure or by the use of a cable and winch system. As the pig travels through the pipe, it scrapes the deposits from the interior wall of the pipe and transports these deposits along the pipeline.

In order to perform its function, the pig must be substantially rigid in order to scrape deposits from the wall of the pipe, but the pig must also be somewhat compressible in order to pass by intended restrictions in the internal pipe cross-section or obstructions that may be present in the pipe.

In some embodiments, the exterior surface of a pipeline pig is formed of a plastic material, such as polyurethane. A disadvantage of these pigs is that the build-up of paraffin or other material inside the pipe may be so rigid that the pig will compress and ride over the build-up, which results in insufficient cleaning.

Normally, the fluid pressure for propelling the pig through the pipe is supplied by water or other liquids which are injected into the pipe at high pressure.

It is also known in the prior art to initially inject high pressure water behind the pig and to then discontinue the injection of water followed by an inert gas to complete propulsion of the pig through the pipe.

As its name implies, mechanical rotary drilling uses a drill bore of the approximate original interior diameter of the pipe to bore out interior wall buildup.

Ultrasonic sound blasts rely on a focused beam of sound as the blast element to remove the residue buildup.

In hydro blasting, a focused high pressure stream of water, or other fluid, is used to remove the residue buildup.

All of the above-mentioned prior methods and devices suffer from one or more disadvantages when one considers the wide variety of currently installed pipeline system layouts and geometries.

Removable of the buildup of undesirable residue from the interior walls of pipes is not the only maintenance challenge.

The interior walls of pipes in many pipeline systems are coated with a lining having qualities that enhance the flow of the pipeline produce through the pipeline. The lining might also help to seal the pipeline from leaks.

Over time, the wearing effect due to friction of the product constantly rubbing against the interior walls as it moves through the pipes will gradually cause the lining to wear away. From time-to-time, the lining must be replaced. Doing so often is expensive and time consuming.

Figure 1:
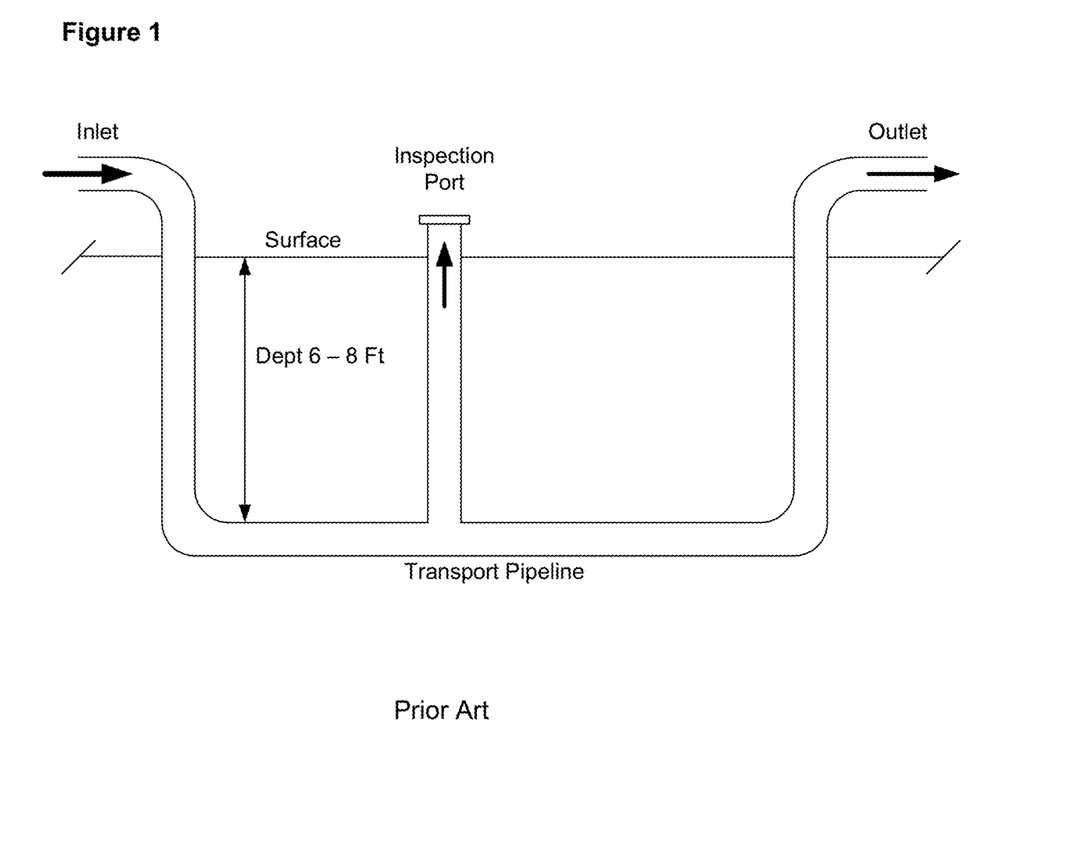
FIG. 1-3 illustrate burial of a typical pipe line system.
Figure 2:
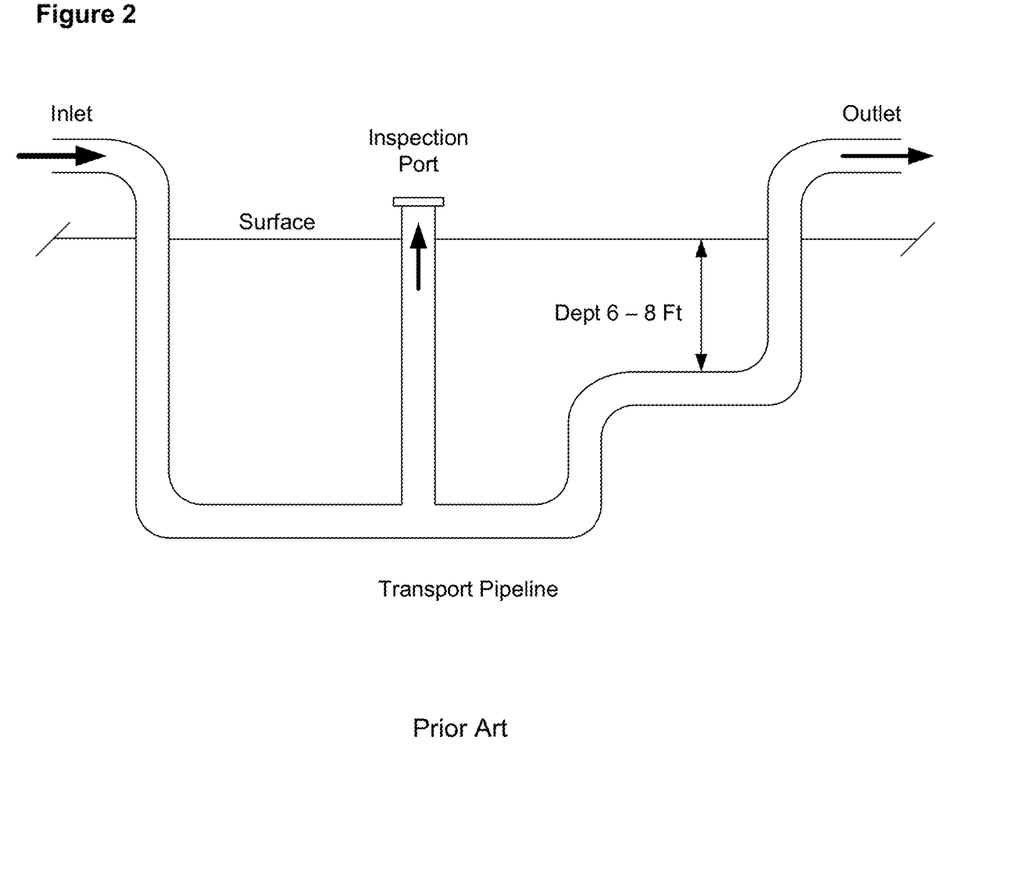

As illustrated in FIG. 1, transport pipeline systems typically are buried 6 to 8 feet below the surface with only an inlet, one or more inspections ports, and an outlet accessible above ground. FIG. 1 illustrated a simple transport pipeline system. FIG. 2 is a further illustration of transport pipeline system showing that the depth of the pipeline is not consistent as natural terrain will vary from place to place as well as obstructions will often be in the way and must be avoided.

Figure 3:
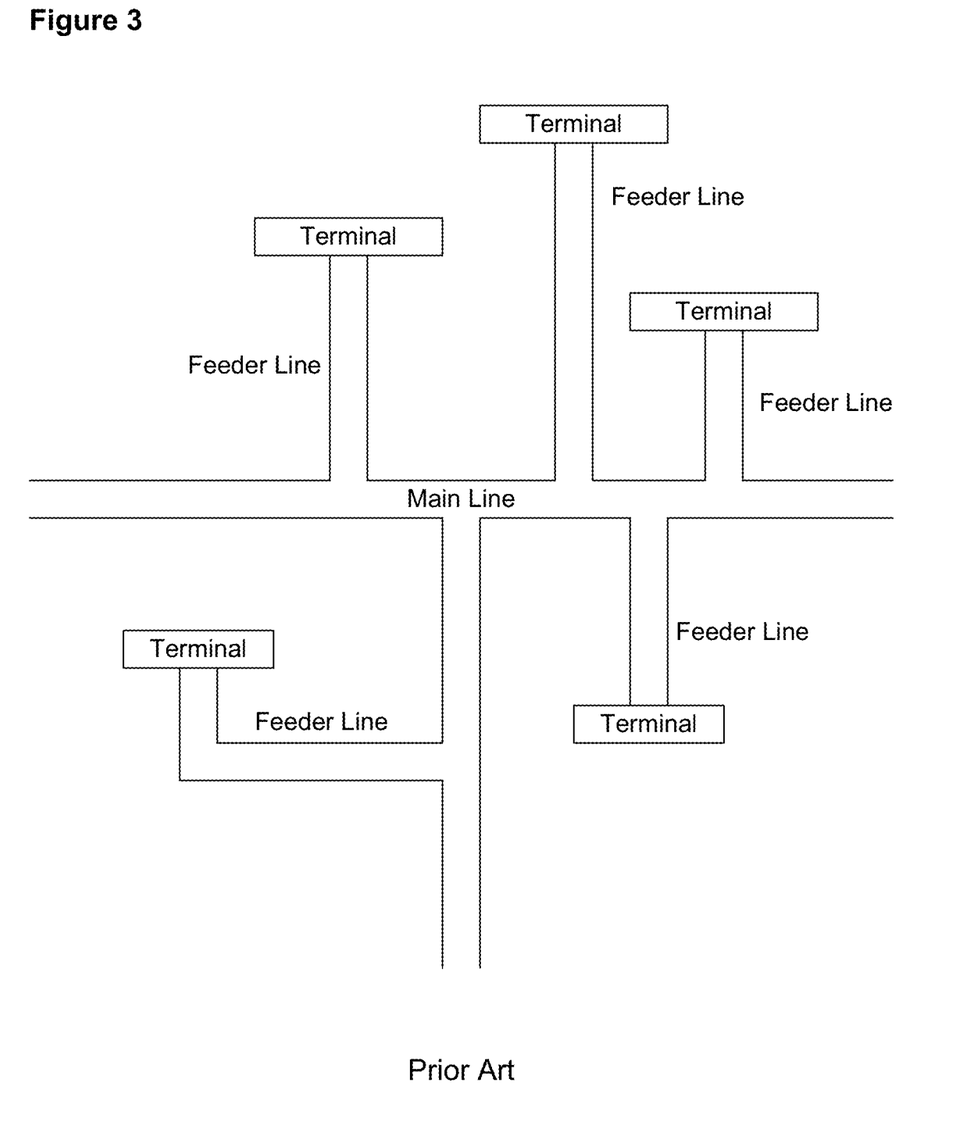

FIG. 3 is a more realistic diagrammatic top view of a modern pipeline system that might be used to carry petroleum from a refinery to customers in difference parts of the country. In fact, most oil and gas is carried across country by pipeline.

Figure 4:
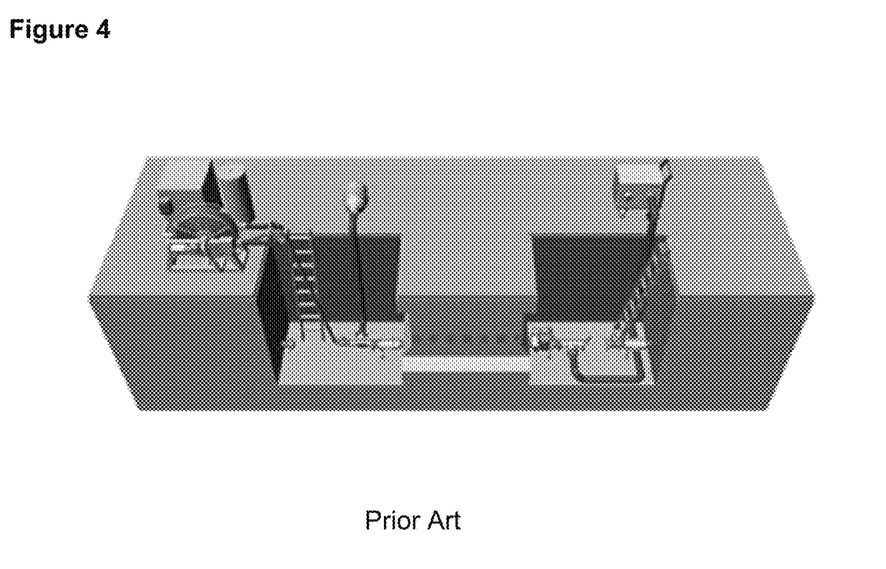
FIG. 4 illustrates a prior art approach to cleaning and maintaining prior art pipeline systems.

FIG. 4 illustrates limitations common among currently available cleaning and lining systems and application methods for pipeline systems. As FIG. 4 shows, access to the pipe line must be gained at a location which will provide a straight run for typical self-propelled or winch-pulled tool, such as the pig described above. All fittings 22-90 degrees are routinely removed to allow tool insertion and lining. In addition, most prior art tools operate in straight pipe segments and can't access vertical portions of the pipeline system, making additional excavations and tool set-ups necessary.

The present invention solves the above noted problems with prior art approaches to cleaning and the replacement of linings in the pipes used in pipeline systems.

BRIEF DESCRIPTION OF THE DRAWING

The novel features of the present invention are set out with particularity in the following detailed description of the preferred embodiment. However, the invention will be understood more fully and clearly from the detailed description of the invention as set forth in the accompanying drawings in which.

DESCRIPTION OF A PREFERRED EMBODIMENT OF THE INVENTION

A preferred embodiment of the present invention will be described with reference to the drawings.

Figure 5:
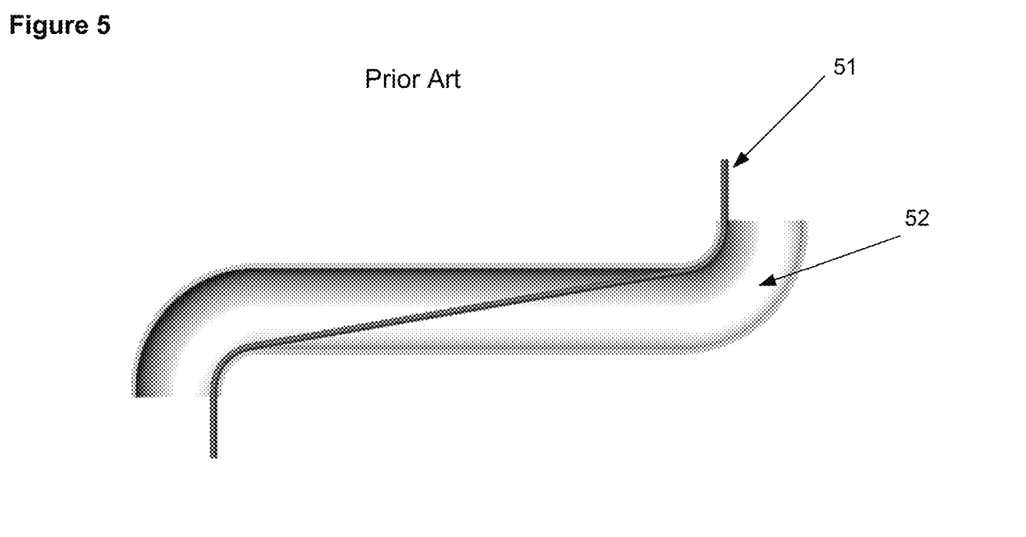
FIG. 5 illustrates the problem of umbilical supply lines seizing as they are drawn around bends in a pipeline.

The present invention provides a pipeline cleaning and maintenance system that is capable of routinely navigating and processing complex pipe geometries. The device of the present invention solves the problem of umbilical supply lines 51 and winch cable lock-up or seizing as they are drawn tight around bends in a pipeline system 52 as illustrated in FIG. 5. Friction resulting from this phenomenon is known by those experienced in pipe rehabilitation to be sufficient to break heavy winch cables or cause damage to the umbilical lines and pipe walls.

While sheaves or pulleys can be installed in large pipes to permit frictionless cable operation where man entry is permitted, use of such devices are time consuming to erect and impossible to deploy in small diameter pipelines.

Figure 6:
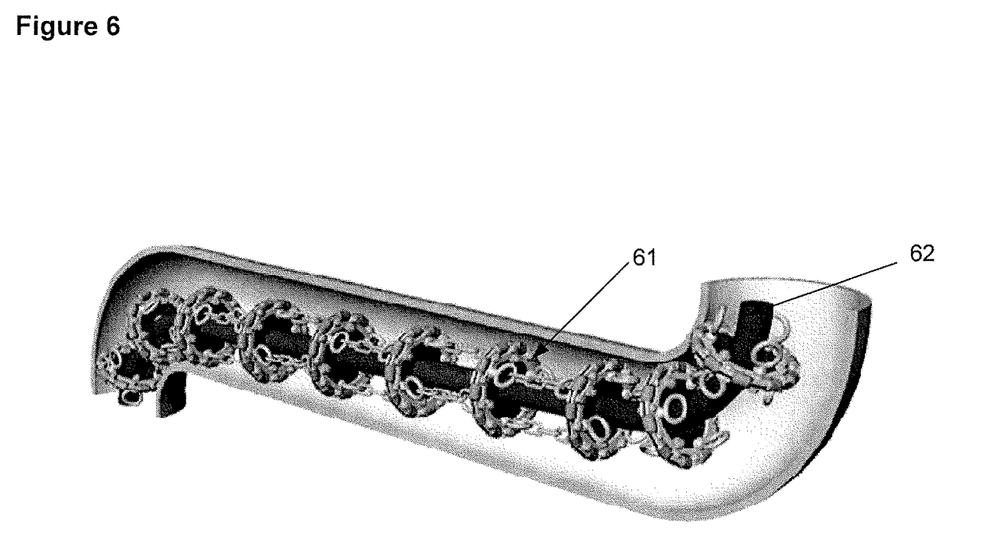
FIGS. 6-11 illustrate various embodiments of the present invention.

FIG. 6 illustrates a cable carrier assembly in accordance with the present invention that is designed to negate friction and seizure of winch cables or umbilical supply lines attached to the tooling.

As can be seen in FIG. 6, a plurality of rollers 61 encase umbilical 62 and are arranged as shown to eliminate binding and minimize friction throughout the length of any cable runs.

A chain or wire rope sheath can be used to winch the system in the event of power loss. Also, the rolling elements 61 permit longer tether deployments than could be made with unsupported hoses and cables.

This system of the invention allows multiple 90 degree turns to be easily traversed and can be rolled onto a take-up reel as tools are retracted from the piping system.

A spinning metal disk tool is used to disperse lining material around the inner circumference of pipe walls. When the spinning disk is driven into and through 90 degree elbow fittings in a pipeline system, inconsistencies in the amount of material deposited onto various areas of the internal pipe wall result.

This phenomenon is prevalent as the tool enters and exits a fitting, as well as passing throughout the fittings radius. In a 90 degree fitting, there is simply far more surface area to be covered on the outer extremities of the inner pipe wall.

Figure 7:
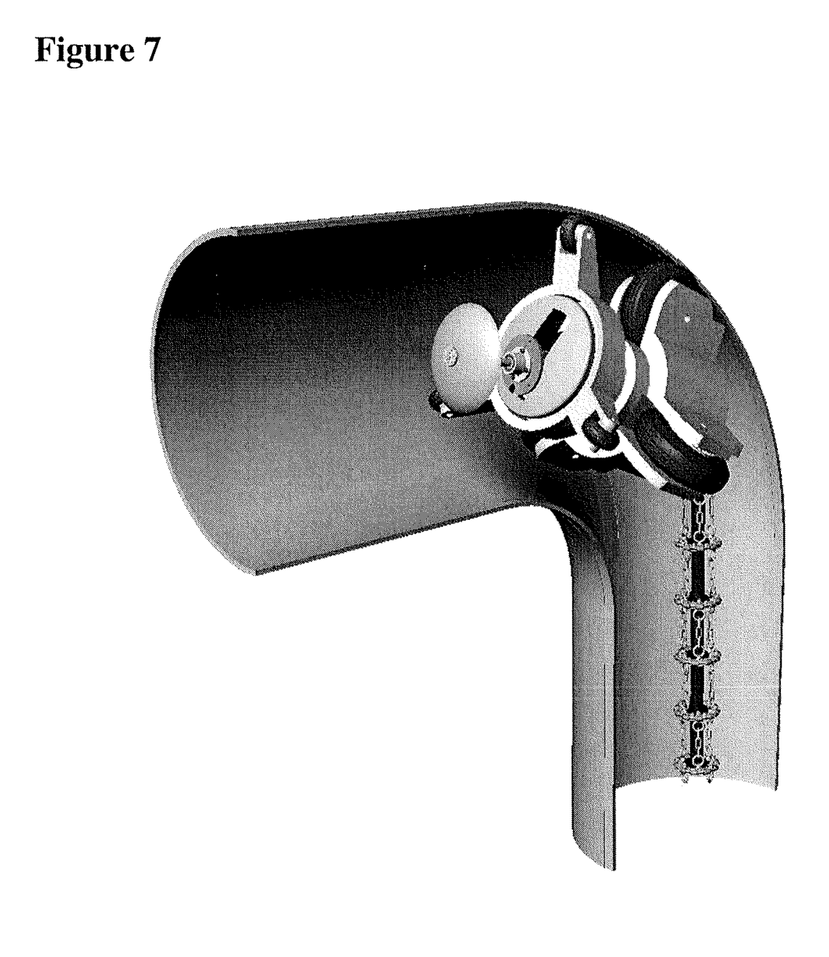
Figure 8:
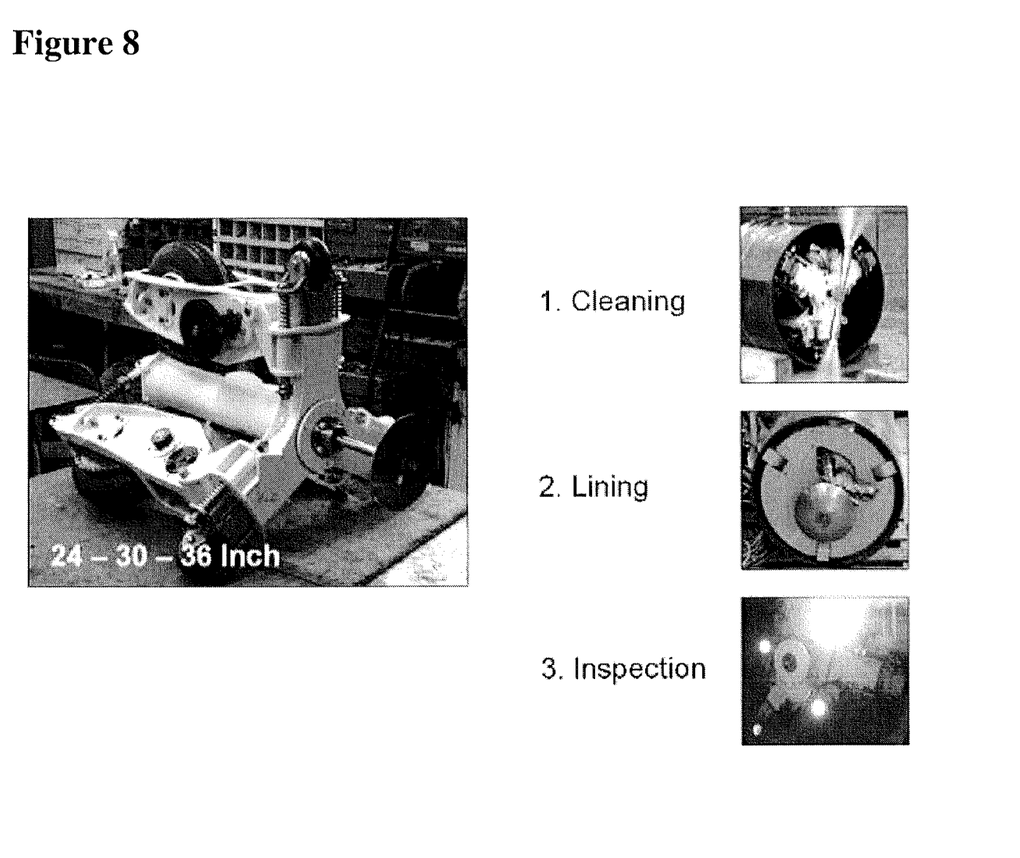
Figure 9:
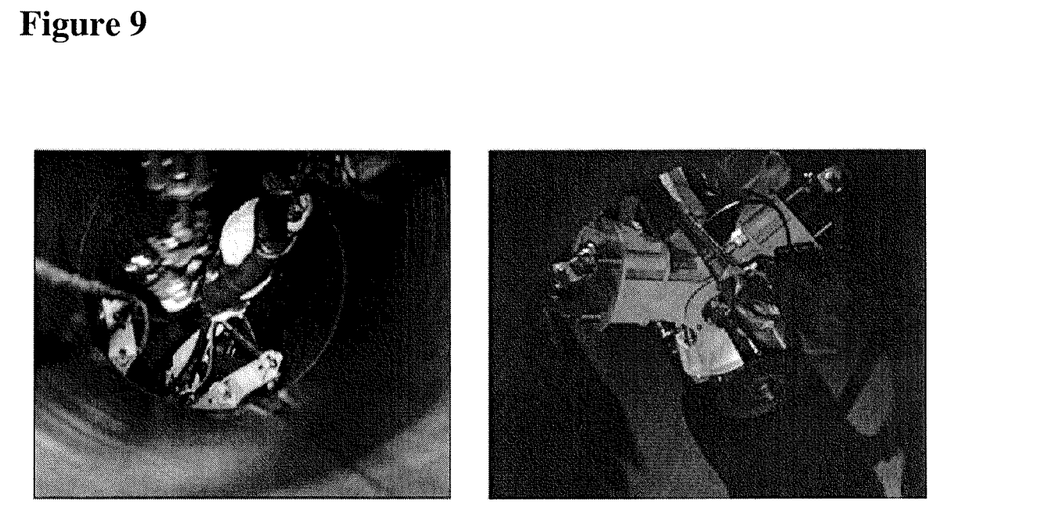
Figure 10:
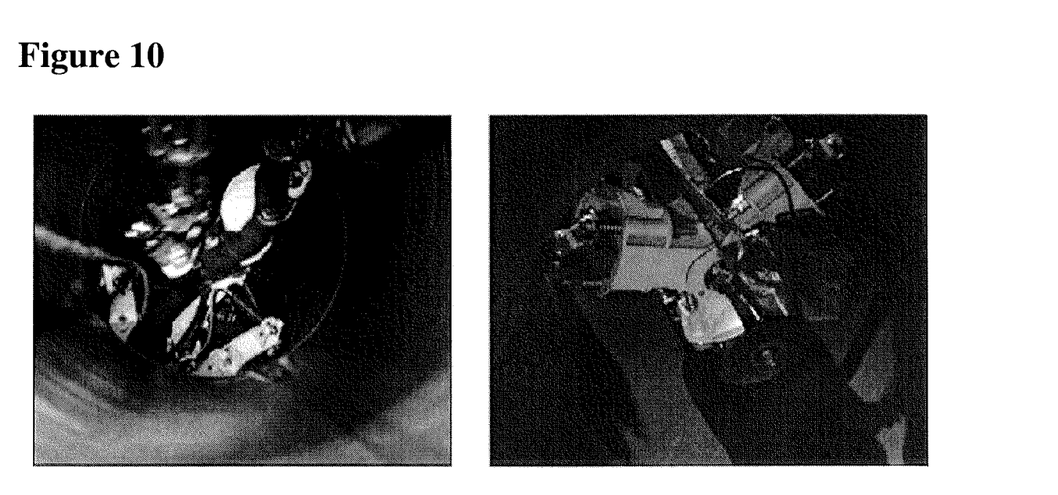
Figure 11:
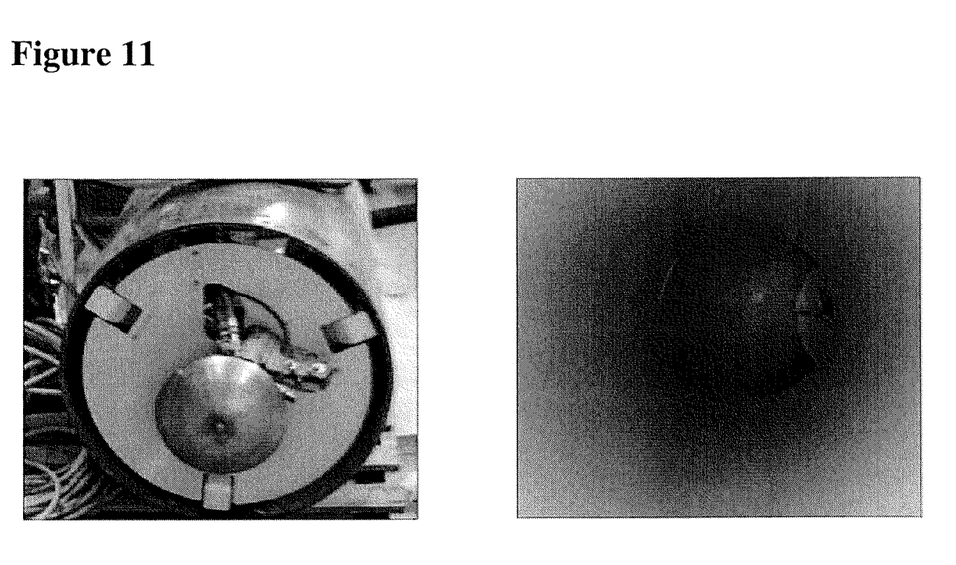

As illustrated in FIG. 7, it was discovered that by providing the proper angular, as well as linear stand-off distance of the spin-cast disk to the pipe wall, that even dispersal of lining materials could be achieved. Coating thicknesses to within 10 thousands (0.010") deviances were found to be reproducible using this technique.

This mechanism becomes very important as many liner materials cannot be applied too thick as excessive heat can build up in the coating and cause exothermic reaction, resulting in a loss of bond to the pipe wall or cracking and bubbling to occur which simply compromises the lining system.

The device of the present invention can be used with many different lateral pipe sizes, includes sizes of 24, 30, and 36 inches.

FIGS. 8-11 illustrated a 24 inch device with pipeline mock-up for cleaning, lining and inspection of pipelines.

The device of the present invention is controlled and driven by a computerized controller using appropriate software. The controller controls the device for optimal speed and position.

Figure 12:
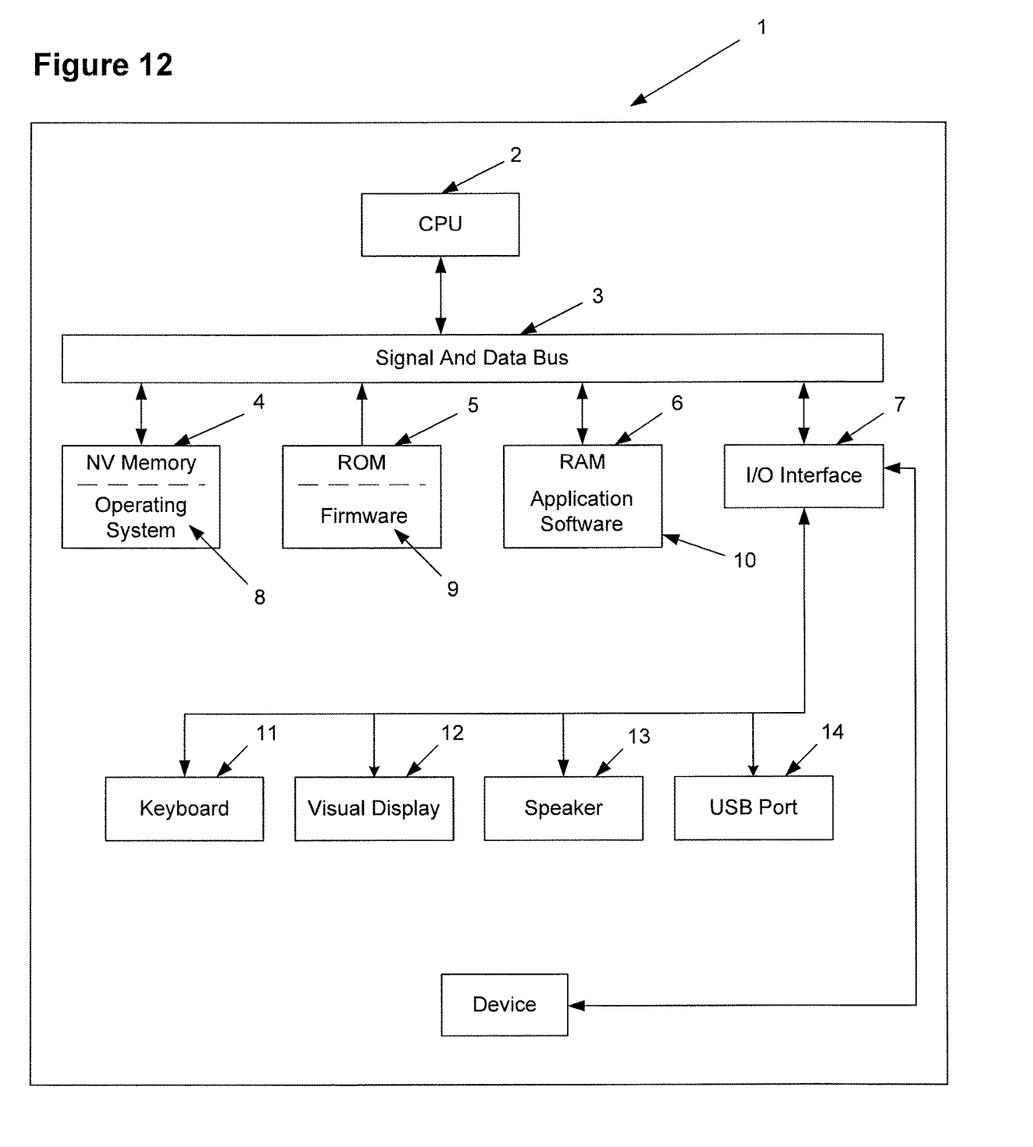
FIG. 12 is a block diagram of a controller which may be used to control the device of the present invention.

FIG. 12 is a block diagram that illustrates the basic components of a controller 1 which can be used to control the device of the present invention.

Controller 1 includes a CPU 2. The CPU is used for executing computer software instructions as is known in the art. CPU 2 is coupled to a number of other elements via a signal and data bus 3 as is also known in the art. These elements include ROM 5 (Read Only Memory) which may be used to store computer software instructions, RAM 6 (Random Access Memory) which also may be used to store computer software instructions, I/O Interface 7 which may be used to interface CPU 2 to elements and/or functions that are external to controller 1, and Non Volatile Memory 4 which may be used to store computer software instructions as well.

As mention above, I/O Interface 7 is used to interface CPU 2 to elements or functions that are external to controller 1. These external elements might include Keyboard 11, Visual Display 12, Speaker 13, and USB Port 14.

Depending on the tasks to be performed by controller 1, its computer software instructions might be divided into two or more separate and distinct categories which are stored in separate portions of ROM 5, RAM 6 and/or Non Volatile Memory 4. In some devices, a basis set of low level operating instructions, known in the art as firmware 9, might be stored in, for example, ROM 5. These low level rudimentary instructions provide the necessary instructions for how the controller communicates with the other computer hardware. Such instructions are necessary for the controller to perform any useful work, regardless of the application for which the device is to be used.

The computer instruction set that is executed by CPU 2 to perform the particular tasks required of the controller is often call "application software" and operationally "sits" on top of firmware 9. As illustrated in FIG. 1, application software 10 is stored in RAM 6. Application software 10 could also be stored in ROM 5 or in Non Volatile Memory 4.

Firmware 9 allows application software 10 to efficiently interface with the other device hardware, such as the elements that are coupled to CPU 2 via I/O Interface 3.

Again, depending on the tasks to be performed by controller 1, a third set of software instructions known in the art as an operating system 8 might operationally "sit" between firmware 9 and application software 10. Operating system 8 is shown as being stored in Non Volatile Memory 4 in FIG. 1 but could be store in RAM 6 as well.

Operating system 8 is the software that is responsible for the management and coordination of activities and the sharing of resources within controller 1.

Further embodiments of the present invention will now be described.

Liner Application Using a Spin-disk & Spray Nozzle Configuration

A control method & apparatus for coating an internal pipe wall with a polymer lining material providing a uniform and reproducible thicknesses to be achieved throughout the conduit thus yielding consistent physical material properties throughout including radii.

Spray application nozzles use pneumatics to force liquid under pressure through a very small diameter orifice, creating unstable sheets of liquid that break up into a defined range of droplet sizes. Due to the patterns formed by each nozzle, it is difficult to arrange them to get even coverage. Therefore it is impossible to suggest or ensure that optimal material properties thus liner performance will result from field installations.

Thus, in this method, a spray nozzle is used to apply the liner material to the surface of a rotating disk. The pneumatically actuated nozzle provides the ability turn on- and off the material flow as well as thoroughly mix the dual component poly material prior to casting. The rotating casting disk is used to further blend the lining material. Centrifugal force applied to the disk causes the lining material to be evenly dispersed from the perimeter of the spinning disk in a continuous 360 deg. pattern on the adjacent pipe wall.

This casting method is preferable for evenly and reliably coating the inside surface of the pipe wall. However, as this assembly is propelled around fittings with radii an uneven distribution of material will result. The effects of this phenomena, (uneven application & thickness), can be minimized or corrected by positioning the spinning disk in the appropriate position inside the conduit. This will permit deposition of the liner material to be concentrated or minimized where desired promoting even distribution throughout the radii.

Figure 13:
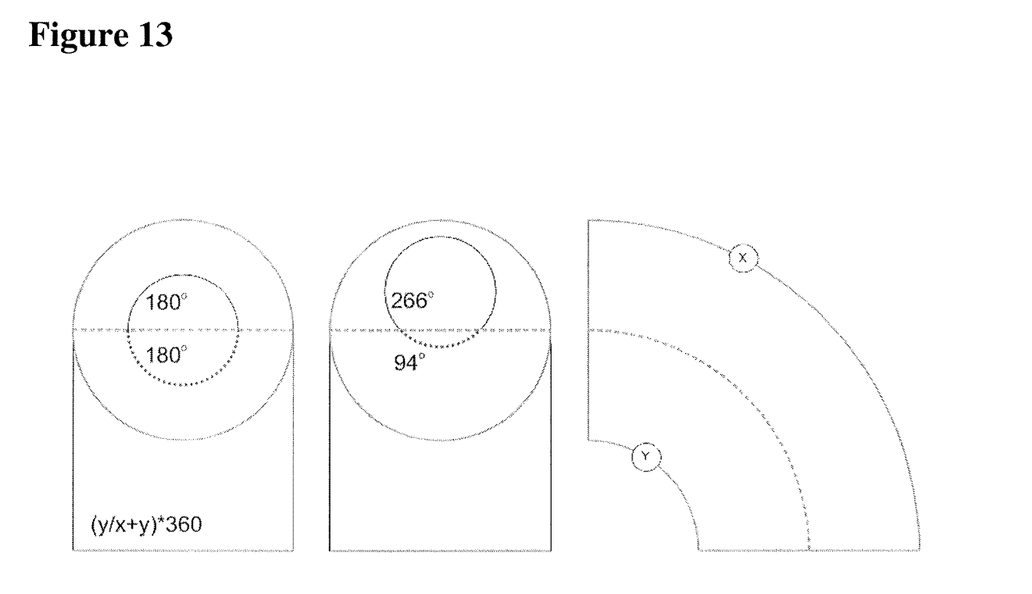
FIG. 13 depicts a formula which can used to determine the position of a spin disk position as it is traverse through a 90 degree elbow.

FIG. 13, depicts a formula which can be used to determine the necessary position of the spin disk position as it is traversed through a 90° elbow.

Sensors/Control Loop

Using commercially available digital accelerometers and gyros attached to the centralizer platform the pitch, yaw, and roll of the centralizer tool may be determined throughout the lining process.

Figure 14:
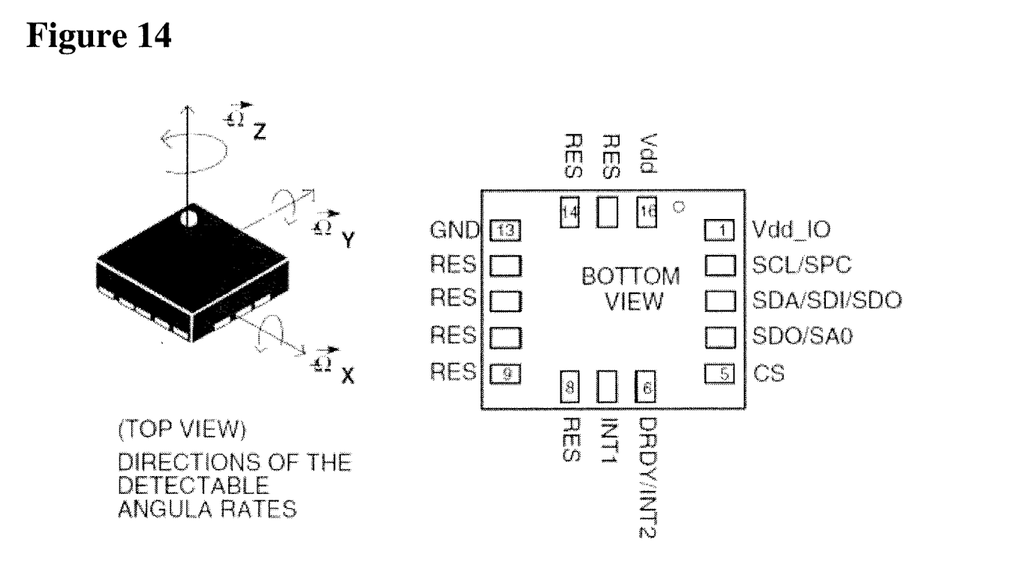
FIG. 14 illustrates a three axis gyro used in accordance with the present invention.

A three axis gyro, FIG. 14, provides the necessary data required to resolve the optimal position, using the above formula, of the spin disk.

The spin disk, currently powered by an air motor, is attached to a multi-axis positioning mechanism. This positioning mechanism may be derived from rotational and single axis sweep mechanism, a motor driven x-y positioning stage, or combination of all depending on available space for the assembly which is primarily influenced by pipe "ID". I assume we will further expand on the advantages of each approach prior to actual filing should that be necessary.

Figure 15:
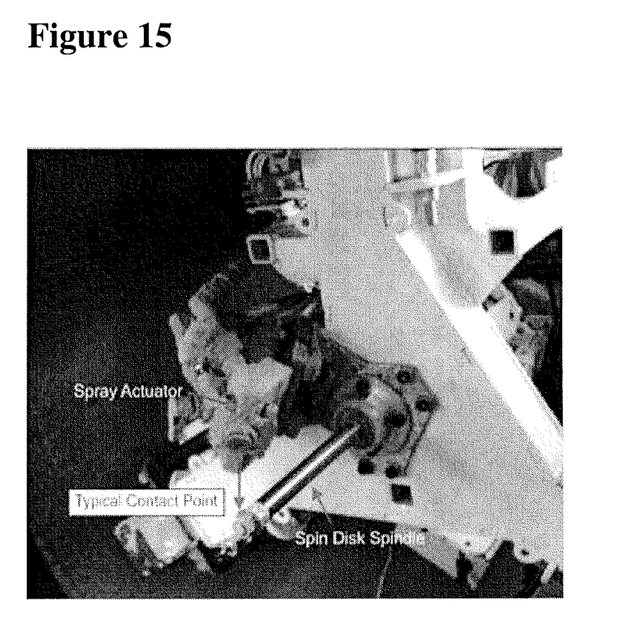
FIGS. 15 and 16 illustrates liner material exiting a spray gun in accordance with the present invention.

Assuming space is sufficient to incorporate a controllable nozzle axis, positioned inline with the roll axis, X in FIG. b, additional capabilities for manipulating deposition of liner materials may be exploited. Under normal circumstances, the liner material exiting the spray gun is directed to impact the spin disk as closely to the spindle mounting shaft as possible, FIG. 15.

Disk rotational speed, in conjunction with surface area of the spin disk face, are optimized to effect and even distribution of the liner material to exit the disk in an a 360 degrees manner.

Figure 16:
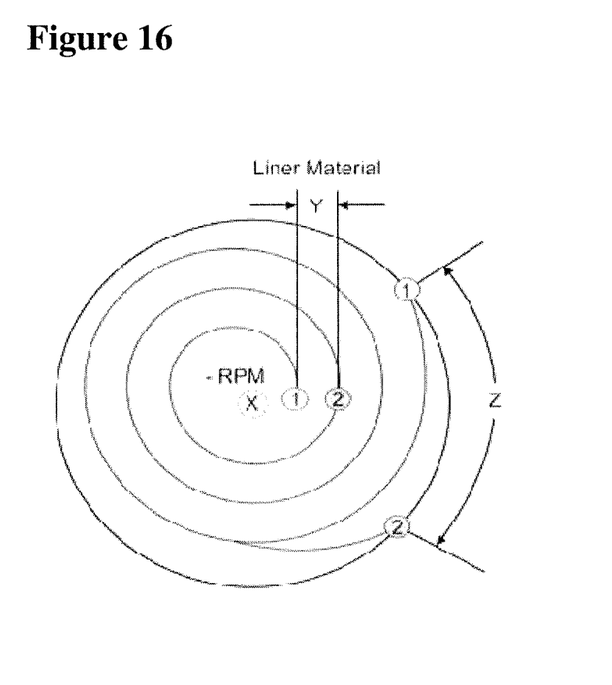

Adjusting the contact point of the liner material on the surface of the spin disk toward the outer edge of the disk will accelerate material dispersal from the outer edge of the spin disk, FIG. 16.

As the contact distance is manipulated volume and trajectory of the liner material can be altered in conjunction with the spindle RPM to determine location and resulting material accumulation on the adjacent pipe wall.

This element of control will prove especially useful when constructing systems for lining small pipe using a rotary+ sweep axis combination as discussed above. The aforementioned variables and calculations also derive the maximum possible disk diameter which can be utilized inside a particular size pipe. Where required parabola shapes as depicted in the above illustrations may be substituted with cone shaped spin disk designed to provide sufficient surface area required to evenly disperse lining materials.

Construing Conductively Interconnected Pipe Sections

A method and apparatus for electrically connecting metallic pipe sections which are electrically isolated at each joint section by rubber or fiber seals during the spray-in liner installation.

Corrosion requires the components to simultaneously exist and react in a metallic piping system. An anode, cathode, and electrolyte must be present for corrosion to occur. Removal of any one of these abovementioned components from the equation is sufficient to disrupt the potential for corrosion. For instance lining a cast iron pipe in a municipal water system restricts oxygenated water (the electrolyte) from contacting the metallic pipe wall eliminating internal corrosion, pitting and ultimate failure. However, it is common for aggressive soil conditions to result in pipe wall failure do to "external" pipe wall corrosion. Therefore, measures beyond internal lining must be employed to provide protection of internal and external surfaces in electrically isolated piping systems.

Figure 17:
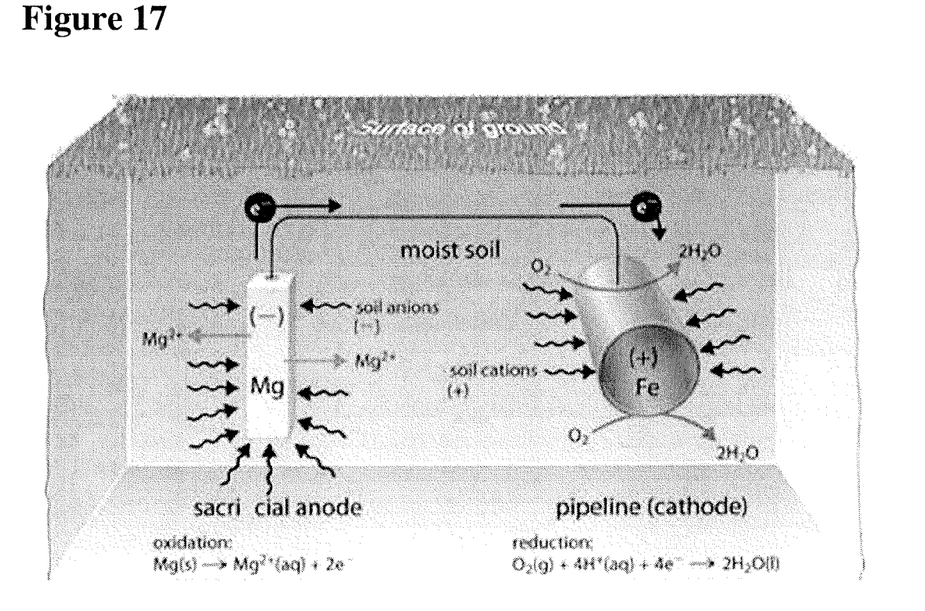
FIGS. 17 and 18 illustrate the effects of a cathodic protection system.

Cathodic protection is a popular method of protecting metallic piping systems from corrosion. It is common practice to direct extraneous electrical currents known to induce anodic and cathodic interaction to replaceable sacrificial materials via cables or wires attached to a piping system, FIG. 17.

Figure 18:
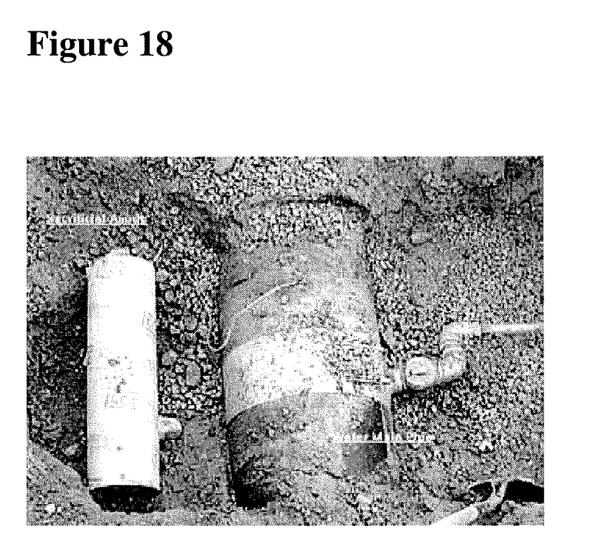

Steel pipe, and other large transmission lines are often protected in this fashion. In the event pipe sections are electrically isolated, each isolated pipe section must be independently connected or joined into a common circuit attached to the sacrificial anodic materials, FIG. 18.

This practice is generally considered cost prohibitive because of the frequency of required excavation or impossible do to disruption in urban areas. Therefore, this technique is valuable where piping assets have been buried and are electrically isolated, such as potable water lines or natural gas distribution lines. This rehabilitation procedure not only eliminates the requirement for multiple excavations but permits both internal and external protection of the pipe to be achieved in a single cost effective procedure which could extend the life of the piping system indefinitely.

Interconnection of electrically isolated pipes during the lining process can be accomplished in two ways:

1. Conductive material(s) such as carbon nanos, conductive graphene, carbon black, or other applicable "conductive materials" can be doped or blended into the lining formulation, or injected at the point of dispersion onto the pipe wall in sufficient measure as to result in a continuous conductive coating which will permit current flow to a singular connection point and attached to sacrificial anode materials.

2. A single "dense" conductor strand, (wire, tape, foam, paste etc.), applied through an applicable dispensing mechanism installed on the lining centralizer can be utilized to interconnect isolated pipe sections as the spray-in process occurs. The conductor will be encapsulated and held in place permanently by the lining system which is bonded to the pipe wall.

Figure 19:
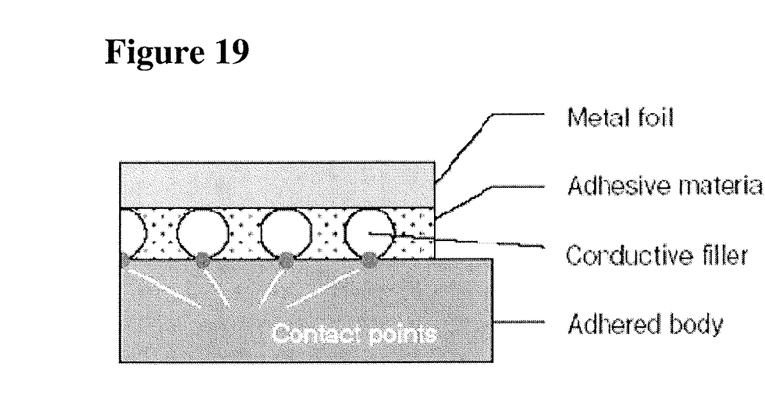
FIGS. 19 and 20 illustrate ways of electrically interconnecting isolated pipes during a lining operation in accordance with the present invention.
Figure 20:
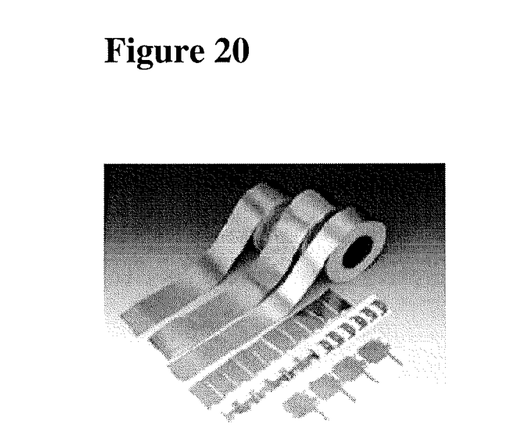

One such example, FIG. 19, represents a series of metallic wire conductors boded to a single adhesive tape. Note: Dissimilar "foil" materials such as copper or aluminum, FIG. 20, should not be used on an iron pipe wall as these materials would likely be consumed via the above described cathodic action. Conductor wires should be iron based and adhesive tape should be comprised of an inert fabric or other material. Also, the adhesive material should be formulated as to not react aggressively with the liner materials being sprayed.

While the foregoing specification teaches the principles of the present invention, with examples provided for the purpose of illustration, it will be appreciated by one skilled in the art from reading this disclosure that various changes in form and detail can be made without departing from the true scope of the invention.

I claim:

1. A system for negating friction and seizure of umbilical supply lines attachable to a tool inside a pipe, said system comprising:
   a plurality of spaced apart annular disk assemblies, each annular disk assemble comprising an umbilical aperture and a plurality of angularly spaced rollers mounted generally on, and extending radially therefrom, an outer circumference of said annular disk assembly;
   a plurality of flexible chain link sections, each chain link section comprising a plurality of interconnected links and having a maximum length when said links are fully extended and a minimum length when said links are fully retracted;
   wherein said plurality of spaced apart annular disk assemblies are arranged along the length of said umbilical supply lines with said umbilical supply lines passing through said umbilical aperture and wherein each of said annular disk assemblies is coupled to immediately adjacent said annular disk assemblies by a plurality of radially spaced said flexible chain link sections;

wherein said system surrounds said umbilical supply lines and maintains an orientation of said plurality of rollers to contact inside surfaces of said pipe as it moves through said pipe.

2. The system of claim 1, wherein said system is adapted for being rolled onto a take-up reel as said system is retracted from said pipe.

3. The system of claim 1, wherein said system is configured to be connected to a control unit, wherein said control unit comprises a central processing unit and operating control software.

* * * * *